United States Patent
Vertriest

[19]

[11] Patent Number: 5,925,169
[45] Date of Patent: Jul. 20, 1999

[54] METHOD AND DEVICE FOR DRYING A GAS WHICH HAS BEEN COMPRESSED BY A COMPRESSOR

[75] Inventor: Danny Etienne Andrée Vertriest, Kontich, Belgium

[73] Assignee: Altas Copco Airpower, naamloze vennootschap, Wilrijk, Belgium

[21] Appl. No.: 08/831,439

[22] Filed: Apr. 1, 1997

[30] Foreign Application Priority Data

Apr. 2, 1996 [BE] Belgium ................................ 09600283

[51] Int. Cl.⁶ .................................................. B01D 53/047
[52] U.S. Cl. ............................ 95/99; 55/DIG. 17; 95/106; 95/115; 95/123; 95/126; 96/126; 96/128; 96/130
[58] Field of Search ................................ 95/99, 105, 106, 95/114, 115, 148, 120, 123, 124, 125, 126; 96/126, 127, 128, 130, 146; 55/DIG. 17

[56] References Cited

U.S. PATENT DOCUMENTS

| | | |
|---|---|---|
| 3,225,517 | 12/1965 | Wachsmuth .................. 55/DIG. 17 |
| 3,226,948 | 1/1966 | Alderson et al. ............. 55/DIG. 17 |
| 3,756,961 | 9/1973 | Francis et al. ..................... 95/124 |
| 3,785,755 | 1/1974 | Novak et al. ................ 55/DIG. 17 |
| 3,891,410 | 6/1975 | Hankison .............................. 96/126 |
| 3,950,154 | 4/1976 | Henderson et al. ............... 96/126 |
| 4,698,073 | 10/1987 | Rohde et al. ...................... 95/123 |
| 4,761,968 | 8/1988 | Basseen et al. .................... 95/123 |
| 4,783,432 | 11/1988 | Settlemyer .......................... 95/98 |
| 5,087,178 | 2/1992 | Wells . | |
| 5,487,769 | 1/1996 | Hutchinson et al. ....... 55/DIG. 17 |
| 5,669,962 | 9/1997 | Dunne ................................ 95/125 |

FOREIGN PATENT DOCUMENTS

| | | |
|---|---|---|
| 1005764 | 1/1994 | Belgium . |
| 0 382 611 | 8/1990 | European Pat. Off. . |
| 2 237 672 | 2/1975 | France . |
| 2 380 063 | 9/1978 | France . |
| 61-238323 | 10/1986 | Japan ................................ 96/128 |
| 63-49223 | 3/1988 | Japan ................................ 96/128 |
| 1 349 733 | 4/1974 | United Kingdom . |
| 2 203 965 | 11/1988 | United Kingdom . |

*Primary Examiner*—Duane S. Smith
*Attorney, Agent, or Firm*—Bacon & Thomas, PLLC

[57] ABSTRACT

Method for drying a gas which has been compressed by a compressor (1) wherein compressed gas (2) from the compressor is driven through an amount of drying agent (3) until a dried, compressed gas (4) is obtained. An amount of used drying agent (7) is regenerated by driving a part (5) of dried compressed gas (4), which is heated first by the compression heat of compressor (1), through used drying agent (7). Moisture is absorbed from used drying agent (7) by a part (5) of the dried compressed gas (4), which is then condensed and separated by cooling. Part (5) of dried compressed gas (4) is then mixed with compressed gas (2) from the compressor to be dried.

6 Claims, 2 Drawing Sheets

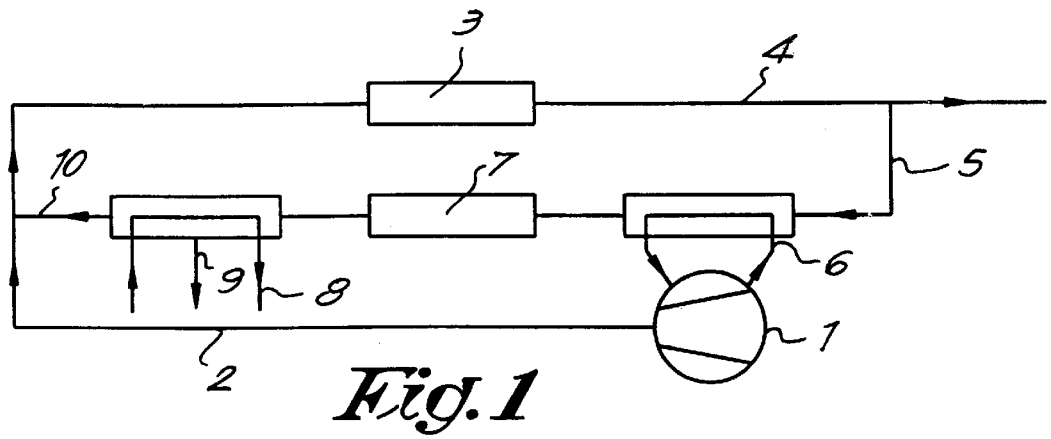
Fig.1
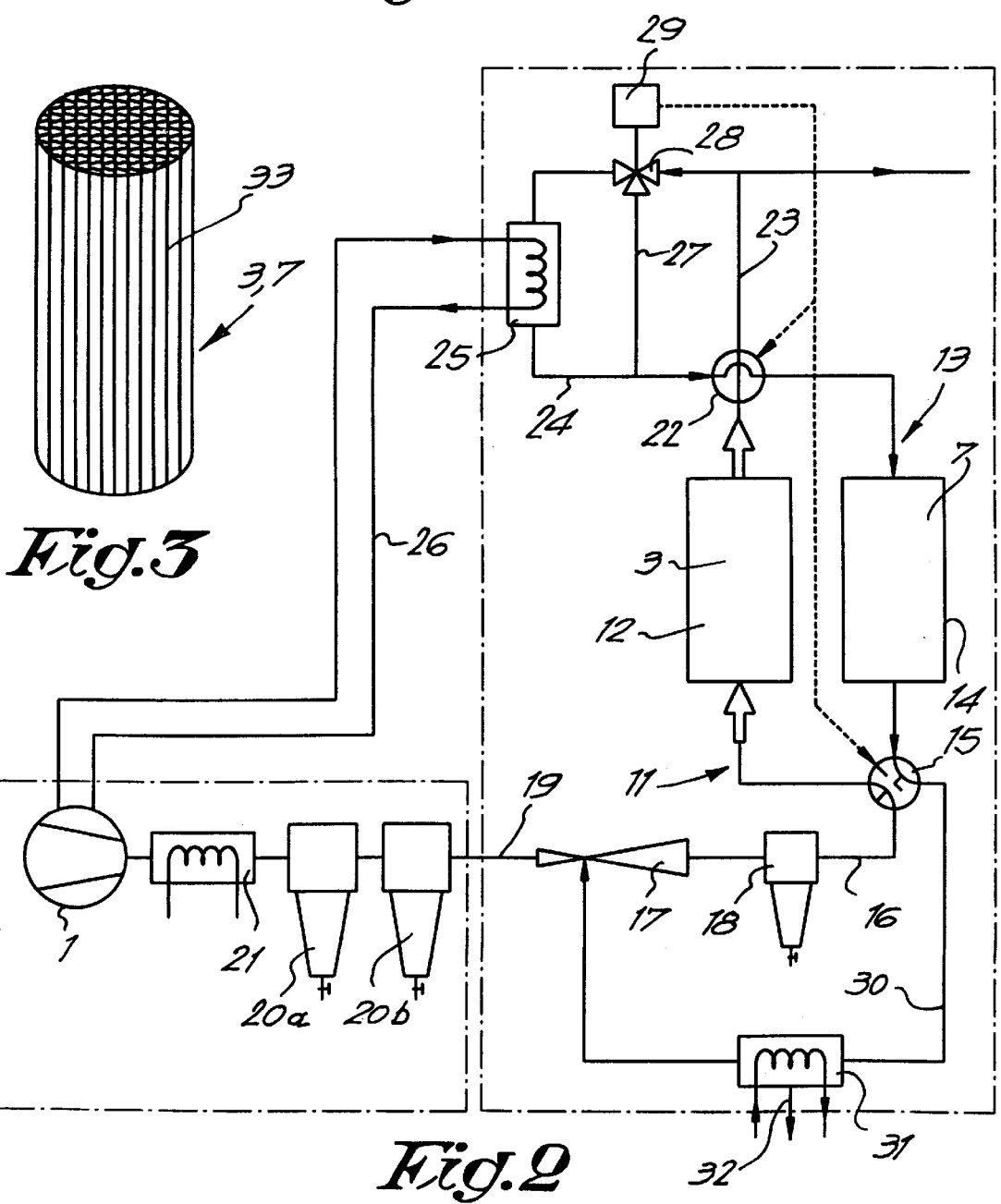
Fig.3
Fig.2

METHOD AND DEVICE FOR DRYING A GAS WHICH HAS BEEN COMPRESSED BY A COMPRESSOR

BACKGROUND OF THE INVENTION

1. Field of the Invention

The invention concerns a method for drying a gas which has been compressed by a compressor.

2. Description of the Related Art

Compressed gas, for example, air, usually has a high moisture content at the outlet of the compressor. This moisture can be disadvantageous to the network of pipes and undesirable in certain applications. Therefore, it is useful, if not necessary, to dry the compressed air.

According to a known method, described in BE-A-1005764, a compressed gas is driven through a drying agent. Already used drying agent is simultaneously regenerated by driving a part of the gas compressed by the compressor, tapped directly from the outlet of the compressor, through it. This gas absorbs water from the already used drying agent. The water is then condensed and separated by cooling the gas. Then the gas is mixed again with the compressed gas to be dried.

Such a method is disadvantageous in that the regeneration is carried out with a gas which is still moist. As a result, the drying or regeneration of the drying agent is rather slow. Consequently, the regeneration of an amount of drying agent takes relatively long compared to the time required to saturate the same amount of drying agent with moisture during the drying of the compressed gas.

Also, a relatively high regeneration temperature is necessary to make the regeneration process take place at an acceptable rate. Due to the operating conditions of the compressor, for example, a low service pressure and/or frequent load/no-load running, said high regeneration temperature is not always available.

SUMMARY OF THE INVENTION

The invention aims at a method for drying gas which has been compressed by a compressor which excludes the above-mentioned and other disadvantages and obtains an efficient drying of the compressed gas.

To this aim, the method for drying a gas which has been compressed by a compressor mainly consists of the following steps. The gas is driven, possibly after it has been pre-cooled, through an amount of drying agent until a dried compressed gas is obtained. An amount of used drying agent is regenerated by driving a part of the dried compressed gas, which is heated first by the compression heat of the compressor, through the drying agent so that moisture is absorbed from the used drying agent. The moisture is then condensed and separated by cooling. This part of the gas is then mixed with the compressed gas coming from the compressor to be dried.

Since the gas which is used for the regeneration of the drying agent has a high temperature and a low humidity, said regeneration will be fast and efficient.

No extra energy is required to heat the gas before regeneration, because the compression heat is available.

This compression heat can be accessed by means of heat exchange with either the cooling agent of the compressor or the air being compressed by the compressor. The former is especially the case with oil-injected compressors, whereas, the latter is especially the case with oil-free compressors.

The invention also concerns a device to apply the method as described above.

The device includes a drying duct system through which compressed gas to be dried flows. The drying duct system is connected at one end to a compressor via a pipe with an ejector. The drying duct system is connected at the opposite end to a discharge pipe. The drying duct system also has a drying zone filled with a drying agent.

The device also includes a regeneration duct system having a regeneration zone filled with used drying agent. The regeneration zone is connected at one end to the discharge pipe by a pipe that runs through a heat exchanger. Fluid which has been heated by the compression flows through the heat exchanger. The regeneration zone is connected at the opposite end to a suction inlet of the ejector by a pipe that runs through a cooler.

A preferred embodiment of the invention contains means to exchange the drying agent from the drying zone after a certain length of time with the drying agent from the regeneration zone which has been regenerated in the meantime. As a result, the drying of the compressed gas can be carried out as an almost continuous process.

BRIEF DESCRIPTION OF THE DRAWINGS

In order to better explain the characteristics of the invention, the following preferred embodiment of a method and a device for drying a gas which has been compressed by a compressor according to the invention is described with reference to the accompanying drawings, in which:

FIG. 1 is a block diagram detecting the method according to the invention;

FIG. 2 schematically represents a preferred embodiment of a device according to the invention;

FIG. 3 shows a view in perspective of the drying agent used in the device according to FIG. 2;

DETAILED DESCRIPTION OF THE PREFERRED EMBODIMENTS

Figure 4:
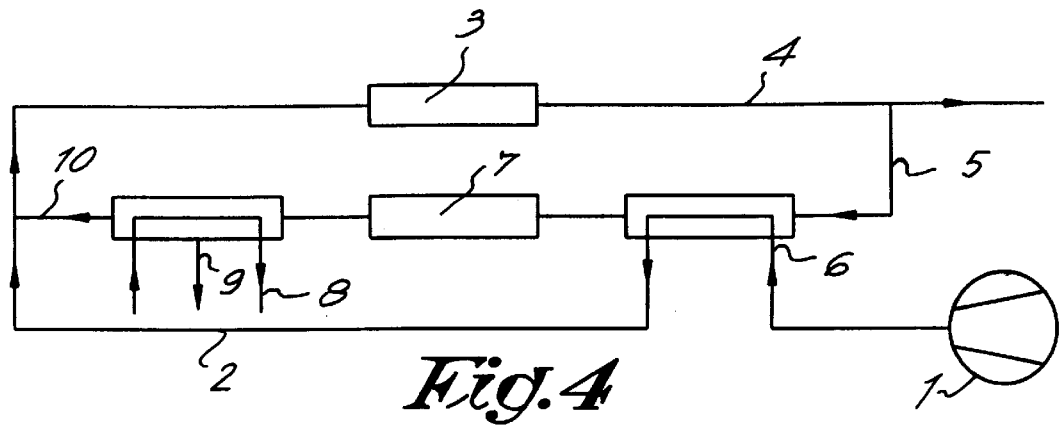
FIG. 4 is a block diagram analogous to that in FIG. 1, but with reference to a variant of the method.

In order to dry a gas 2 which has been compressed by a compressor 1, as represented in FIG. 1, gas 2 discharged from the compressor is driven through a first amount of drying agent 3.

Simultaneously, a part 5 of already dried compressed gas 4 is first heated by the compression heat of compressor 1 through heat exchange with a cooling liquid 6 used in compressor 1, then is driven through a practically equal second amount of used drying agent 7 so as to regenerate the used drying agent, and finally cooled by heat exchange with a cooling liquid 8 so as to condense the moisture absorbed from the used drying agent 7.

Condensed moisture 9 is separated from part 5 of the gas. The resulting cooled and relatively dry gas 10 is subsequently mixed with compressed gas 2 which must still be dried.

As the compression heat of compressor 1 is always available, no extra energy need be supplied to heat the dried gas 1 before regeneration.

Each time drying agent 3 becomes saturated, it can be exchanged with used drying agent 7 which has been regenerated in the meantime. The regenerated used drying agent 7 is cooled during a time interval, right before the exchange, preferably by momentarily driving part 5 of the dried gas 4 through it, without, however, heating it by heat exchange with the cooling liquid 6 of the compressor 1.

When an appropriate regeneration flow is selected, the regeneration of used drying agent 7 is faster than the saturation of drying agent 3. The time remaining until the moment of exchange can be used to cool regenerated used drying agent 7.

The device as represented in FIG. 2 can be used to carry out the above-described method.

This device includes a drying duct system 11 through which compressed gas via pipe 19 to be dried flows. Duct system 11, at its inlet is connected to compressor 1 for receiving undried, compressed gas 2 and, at its outlet, to a discharge pipe 23 via a four-way valve 22 for discharging dried compressed gas corresponding to 4 in FIG. 1. The inlet of drying duct system 11 is connected via a four-way valve 15 to a pipe 16 which is connected to an outlet of an ejector 17. Pipe 16 includes a water separator 18 within. An inlet of ejector 17 is connected to the outlet of compressor 1 via a pipe 19. A water separator 20a, a filter 20b and a cooler 21 are included within pipe 19.

Drying duct system 11 has a drying zone 12 which is filled with an amount of drying agent 3.

The device also includes a regeneration duct system 13 having a regeneration zone 14 in which a practically equal amount of used drying agent 7 is provided.

The inlet of regeneration duct system 13 is connected to a pipe 24 via four-way valve 22. A heat exchanger 25 is included within pipe 24. The primary circuit of heat exchanger 25 is a cooling circuit 26 of compressor 1.

Heat exchanger 25 is bridged by a pipe 27 which is connected, upstream in relation to heat exchanger 25, to pipe 24 via a three-way valve 28. Three-way valve 28 is coupled to a control unit 29.

Via four-way valve 15, the outlet of regeneration duct system 13 is connected to a pipe 30 which is connected in turn to a suction inlet of ejector 17. A cooler 31, provided with a discharge pipe 32 for condensed moisture 9, is included within pipe 30.

Drying agent 3 and 7 consists of or contains a desiccant which absorbs moisture, such as silica gel, molecular sieves or activated alumina. It may have various shapes, such as the shape of desiccant grains stacked in a reservoir, or it may contain a desiccant provided on a support 33, for example, a bundle of ducts as represented in FIG. 3.

Support 33 is made of glass fiber based cardboard and has a honeycomb structure covered with the desiccant on the inside. As a result, the contact surface with the desiccant is very large.

Four-way valves 22 and 15 are coupled to control unit 29. Together with said control unit they form means to exchange drying agent 3 in drying zone 12 with regenerated used drying agent 7 in regeneration zone 14. In particular, this exchange is accomplished by rotating drying duct system 11 into regeneration duct system 13 and vice versa.

The working of the device is simple and as follows.

The compressed gas 2 to be dried coming from compressor 1, which has a temperature of about 30° C. after having been pre-cooled in cooler 21, is driven through drying duct system 11 by ejector 17 via pipe 16. In water separator 18, any moisture which is still present is separated. In drying zone 12, the gas is further dried by drying agent 3.

Dried gas 4 leaves drying duct system 11 via discharge pipe 23 at a temperature of about 40° C.

At the same time, used drying agent 7 is regenerated in regeneration zone 14 by tapping off a part 5 of dried gas 4 via pipe 24 and driving it through used drying agent 7. Three-way valve 28 hereby leaves pipe 24 open, whereas it closes off pipe 27.

In heat exchanger 25, which is included in pipe 24, tapped off part 5 of gas 4 is heated up to a temperature of about 80° C. by cooling liquid 6, which has absorbed the compression heat and has a temperature of about 90° C.

After used drying agent 7 has been dried, thus heated part 5 of gas 4 is cooled in cooler 31. Condensed moisture 9 is thereby separated and removed via discharge pipe 32.

Remaining cooled gas 10, at a temperature of about 30° C, is sucked in via return pipe 30 through the suction inlet of the venturi of ejector 17.

Immediately after the venturi on the inlet of ejector 17, cooled gas 10 is mixed in a mixing zone with compressed gas 2 to be dried coming from compressor 1. Near the outlet of ejector 17, the pressure of the cooled gas is recycled.

After drying agent 7 has been sufficiently regenerated, for example, after a preset time, control unit 29 orders three-way valve 28 to change its position to interrupt pipe 24 and connect pipe 27 to discharge pipe 23.

As a result, part 5 of gas 4 which is driven through used drying agent 7 is no longer heated, so that used drying agent 7 cools down.

When drying agent 3 is saturated with moisture, control unit 29 orders four-way valves 22 and 15 to change their positions such that drying duct system 11 and regeneration duct system 13 change places. Drying agent 3 which has been saturated with moisture thus becomes used drying agent 7, and regenerated used agent 7 becomes drying agent 3.

In this manner, the same amount of drying agent successively becomes drying agent 3 and used drying agent 7, so that the working of the device is practically continuous.

The drying of compressed gas 2 of compressor 1 is thus carried out in a very efficient and economical manner.

The embodiment of the method represented by the block diagram of FIG. 4 only differs from the above-described method in that heating of part 5 of the compressed gas, which is used for the regeneration of used drying agent 7, is not heated by cooling liquid 6 of compressor 1, but directly by the hot, compressed gas 2 which leaves compressor 1. This embodiment can be applied in particular in oil-free compressors.

This method has the same advantages as the above-described method.

Figure 5:
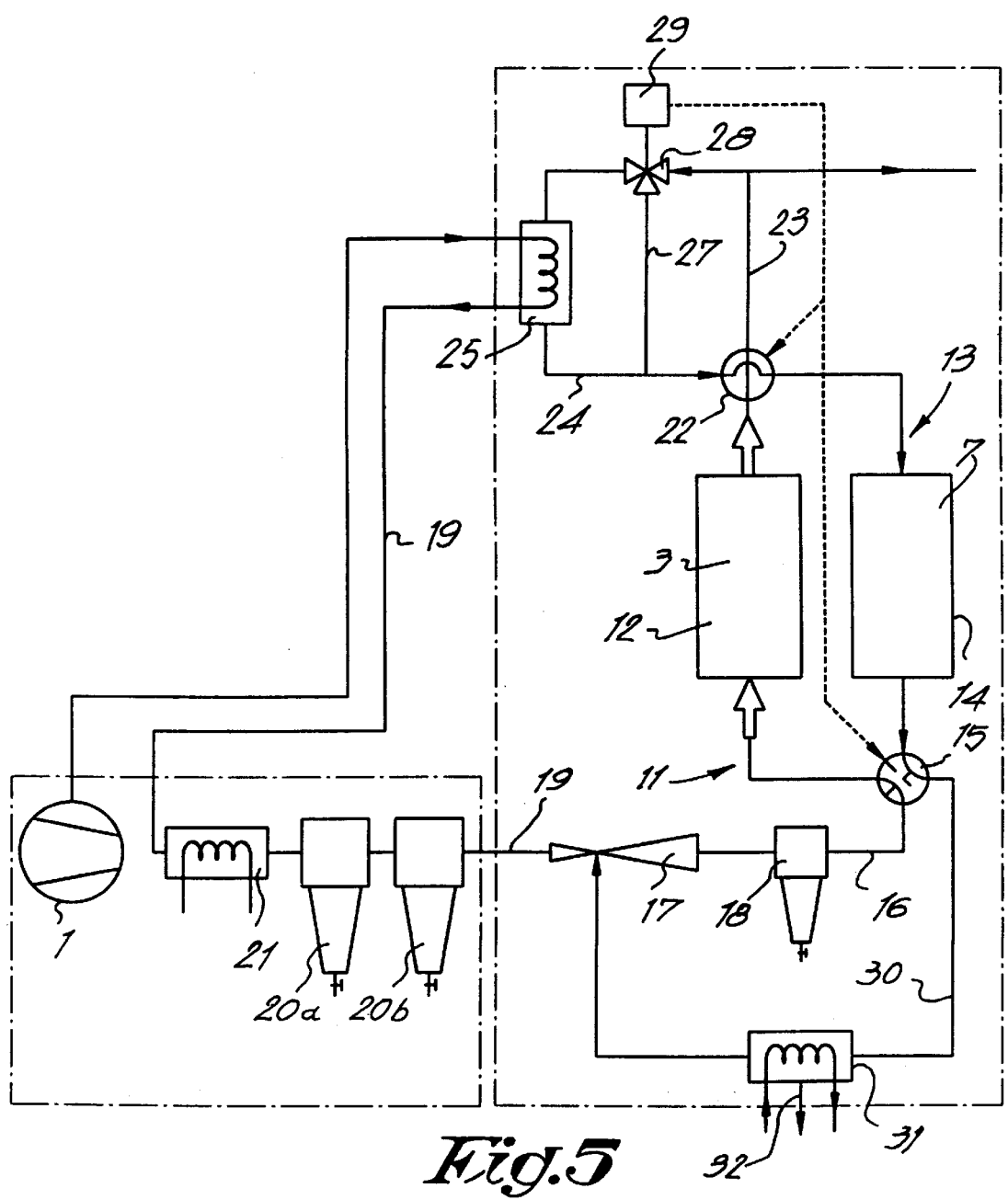
FIG. 5 schematically shows another embodiment of a device analogous to that in FIG. 2, but with reference to the method according to the block diagram of FIG. 4.

Consequently, the device which is used to carry out this embodiment represented in FIG. 5 only differs from the device represented in FIG. 2 in that the primary circuit of heat exchanger 25 is no part of a cooling circuit 6 of compressor 1, but is part of pipe 19 situated between compressor 1 and cooler 21 to receive hot, compressed gas 2.

The use and advantages of this device are the same as described in relation to the embodiment according to FIGS. 1 and 2.

The invention is by no means limited to the above-described embodiment represented in the accompanying drawings; on the contrary, such a method and device for drying a gas which has been compressed by a compressor can be carried out in all sorts of variants while still remaining within the scope of the invention.

Thus, the means to exchange the drying agents may contain a rotor, instead of two four-way valves, upon which the drying zone and the regeneration zone are provided. The zones can be brought from the drying duct system into the regeneration duct system and vice versa due to rotation of the rotor.

I claim:

1. Method for drying a gas which has been compressed by a compressor (1), comprising the stets of:
    driving a compressed gas (2) discharged from a compressor through a first amount of drying agent (3) until a dried compressed gas (4) is obtained;
    heating only a part of the dried compressed gas by the compression heat of the compressor;
    regenerating an amount of used drying agent (7) by driving the heated part (5) of the dried compressed gas (4) through the amount of used drying agent (7) so that moisture is absorbed from the used drying agent (7);
    condensing and separating the absorbed moisture by cooling the part (5) of the dried compressed gas (4); and
    mixing the part (5) of the dried compressed gas (4), after condensing and separating the absorbed moisture, with the compressed gas (2) discharged from the compressor, wherein the compressor is supplied with a cooling agent, and the part (5) of the dried compressed gas (4) is heated by the compression heat as a result of heat exchange with the cooling agent (6) of the compressor (1).

2. Method for drying a gas which has been compressed by a compressor (1), comprising the steps of:
    driving a compressed gas (2) discharged from a compressor through a first amount of drying agent (3) until a dried compressed gas (4) is obtained;
    heating only a part of the dried compressed gas by the compression heat of the compressor;
    regenerating an amount of used drying agent (7) by driving the heated part (5) of the dried compressed gas (4) through the amount of used drying agent (7) so that moisture is absorbed from the used drying agent (7);
    condensing and separating the absorbed moisture by cooling the part (5) of the dried compressed gas (4);
    mixing the part (5) of the dried compressed gas (4), after condensing and separating the absorbed moisture, with the compressed gas (2) discharged from the compressor; and
    after a predetermined interval of time, exchanging the first amount of drying agent (3) with the amount of used drying agent (7) after the used drying agent has been regenerated, wherein the regenerated used drying agent (7) is cooled right before its exchange with the first amount of drying agent.

3. Method according to claim 2, including cooling the regenerated used drying agent by the part (5) of the dried compressed gas (4) which is no longer being heated.

4. Apparatus for drying air to be dried discharged from a compressor outlet comprising:
    a drying duct system communicating with a compressor outlet for conveying air to be dried discharged from a compressor;
    a drying zone including an inlet and an outlet in communication with the drying duct system, said drying zone containing a first amount of drying agent;
    a regenerator zone containing a second amount of drying agent to be regenerated, said regenerator zone including an inlet and an outlet in communication with a regenerator duct system, said regenerator duct system arranged to convey a portion of dried air from the outlet of the drying zone to the inlet of the regenerator zone;
    a heat exchanger which heats only the portion of dried air conveyed in the regenerator duct system located between the drying zone and the regenerator zone, said heat exchanger arranged to use heat generated by operation of the compressor as a heating source;
    an ejector driven by a flow of air to be dried in the drying duct system between the compressor and the drying zone, said ejector including a suction inlet;
    said regenerator zone outlet connected by a return conduit to said ejector suction inlet; and
    an air cooler in the return conduit for cooling air discharged from the regenerator zone, said compressor including a compressor cooling circuit containing a heat exchange fluid and a conduit for circulating the heat exchange fluid to said heat exchanger for heating the dried air in the regenerator duct system.

5. Apparatus for drying air to be dried discharged from a compressor outlet comprising:
    a drying duct system communicating with a compressor outlet for conveying air to be dried discharged from a compressor;
    a drying zone including an inlet and an outlet in communication with the drying duct system, said drying zone containing a first amount of drying agent;
    a regenerator zone containing a second amount of drying agent to be regenerated, said regenerator zone including an inlet and an outlet in communication with a regenerator duct system, said regenerator duct system arranged to convey a portion of dried air from the outlet of the drying zone to the inlet of the regenerator zone;
    a heat exchanger which heats only the portion of dried air conveyed in the regenerator duct system located between the drying zone and the regenerator zone, said heat exchanger arranged to use heat generated by operation of the compressor as a heating source;
    an ejector driven by a flow of air to be dried in the drying duct system between the compressor and the drying zone, said ejector including a suction said regenerator zone outlet connected by a return conduit to said ejector suction inlet;
    an air cooler in the return conduit for cooling air discharged from the regenerator zone; and
    a drying agent exchange system for exchanging the second amount of drying agent with the first amount of drying agent following regeneration of said second amount of drying agent, said exchange system including first and second four-way valves connecting the drying duct system and the regenerator duct system for causing selective reversal of function between the drying duct system and the regenerator duct system, and a controller for selective actuation of the four-way valves.

6. Apparatus for drying air to be dried discharged from a compressor outlet comprising:
    a drying duct system communicating with a compressor outlet for conveying air to be dried discharged from a compressor;
    a drying zone including an inlet and an outlet in communication with the drying duct system, said drying zone containing a first amount of drying agent;
    a regenerator zone containing a second amount of drying agent to be regenerated, said regenerator zone including an inlet and an outlet in communication with a regenerator duct system, said regenerator duct system arranged to convey a portion of dried air from the outlet of the drying zone to the inlet of the regenerator zone;

a heat exchanger which heats only the portion of dried air conveyed in the regenerator duct system located between the drying zone and the regenerator zone, said heat exchanger arranged to use heat generated by operation of the compressor as a heating source;

an ejector driven by a flow of air to be dried in the drying duct system between the compressor and the drying zone said ejector including a suction inlet;

said regenerator zone outlet connected by a return conduit to said ejector suction inlet;

an air cooler in the return conduit for cooling air discharged from the regenerator zone;

a regenerator cooling conduit arranged to selectively receive a portion of cool dried air from the drying duct system following discharge of such cool dried air from the drying zone and to supply such cool dried air to the regenerator duct system for conveyance to the regenerator zone inlet; and a selective controllable valve device in the drying duct system between the drying zone and the heat exchanger for controlling flow of cool dried air into the regenerator duct system for conveyance to the inlet of the regenerator zone.

* * * * *